(12) United States Patent
Krishnappa et al.

(10) Patent No.: US 11,562,341 B2
(45) Date of Patent: Jan. 24, 2023

(54) SECURE COMMUNICATIONS BETWEEN FUELING STATION COMPONENTS

(71) Applicant: Wayne Fueling Systems LLC, Austin, TX (US)

(72) Inventors: Vinod Krishnappa, Bengaluru Karnataka (IN); Om Prakash Gupta, Bengaluru Karnataka (IN); Harish Veeravalli, Bengaluru Karnataka (IN); Gautham Ramamurthy, Bengaluru Karnataka (IN); Henry Fieglein, Leander, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 176 days.

(21) Appl. No.: 16/985,726

(22) Filed: Aug. 5, 2020

(65) Prior Publication Data

US 2022/0044224 A1 Feb. 10, 2022

(51) Int. Cl.
| | |
|---|---|
| *G06Q 20/32* | (2012.01) |
| *G06K 7/10* | (2006.01) |
| *G06K 7/14* | (2006.01) |
| *G06F 3/0488* | (2022.01) |

(52) U.S. Cl.
CPC ..... *G06Q 20/3276* (2013.01); *G06K 7/10722* (2013.01); *G06K 7/1417* (2013.01); *G06F 3/0488* (2013.01)

(58) Field of Classification Search
CPC ........... G06Q 20/3276; G06K 7/10722; G06K 7/1417; G06F 3/0488
See application file for complete search history.

(56) References Cited

U.S. PATENT DOCUMENTS

| | | |
|---|---|---|
| 9,135,615 B1 | 9/2015 | Mutha |
| 9,582,792 B2 | 2/2017 | Bonk et al. |
| 10,318,963 B1 | 6/2019 | Prasad et al. |
| 10,532,921 B2 | 1/2020 | Fieglein et al. |
| 10,577,237 B2 | 3/2020 | Fieglein |
| 10,726,508 B2 | 7/2020 | Morris et al. |
| 2003/0041330 A1 | 2/2003 | Smith |
| 2008/0313028 A1 | 12/2008 | Williams et al. |
| 2014/0100692 A1 | 4/2014 | Chittenden, Jr. et al. |
| 2015/0178721 A1* | 6/2015 | Pandiarajan ..... G06K 19/06112 705/64 |
| 2018/0105413 A1 | 4/2018 | Fieglein et al. |

(Continued)

FOREIGN PATENT DOCUMENTS

WO 2017180518 A1 10/2017

OTHER PUBLICATIONS

International Search Report and Written Opinion received for PCT Application No. PCT/US21/44465, dated Nov. 19, 2021, 14 pages.

*Primary Examiner* — Bennett M Sigmond
*Assistant Examiner* — Marla Hudson
(74) *Attorney, Agent, or Firm* — Mintz Levin Cohn Ferris Glovsky and Popeo, PC; Lisa Adams

(57) ABSTRACT

A selection of a fueling station item, graphically depicted on a display of a fuel dispenser and corresponding to an available fueling station product, can be received by at least one data processor of a fuel dispenser. A two dimensional barcode based on the selected fueling station item can be determined. The two dimensional barcode can be provided to the fuel dispenser display for graphical depiction on the fuel dispenser display.

24 Claims, 5 Drawing Sheets

(56) References Cited

U.S. PATENT DOCUMENTS

2019/0225483 A1    7/2019  Williams et al.
2019/0244205 A1*   8/2019  Fieglein .................. G07F 9/001
2020/0202320 A1    6/2020  Royyuru et al.

* cited by examiner

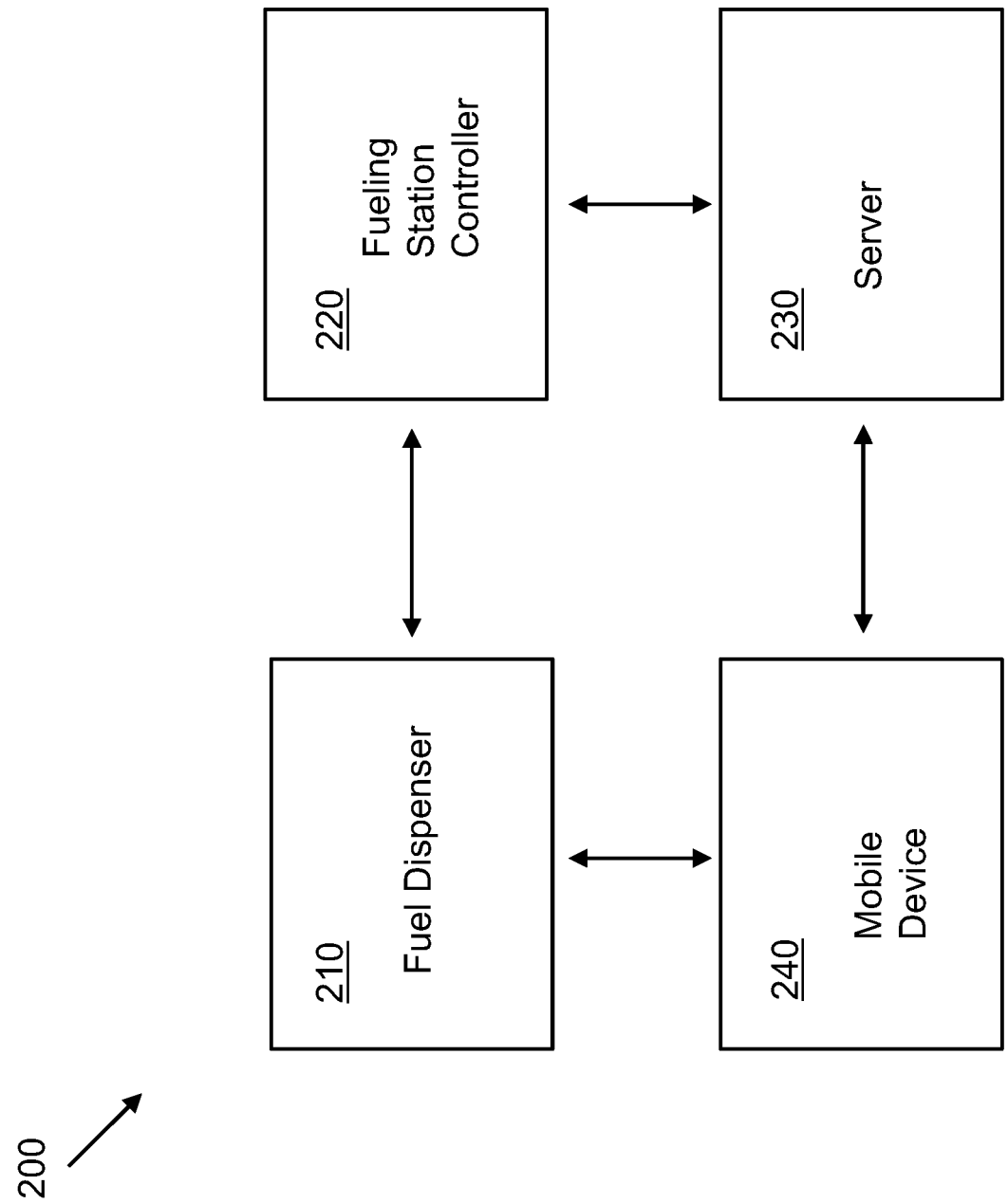

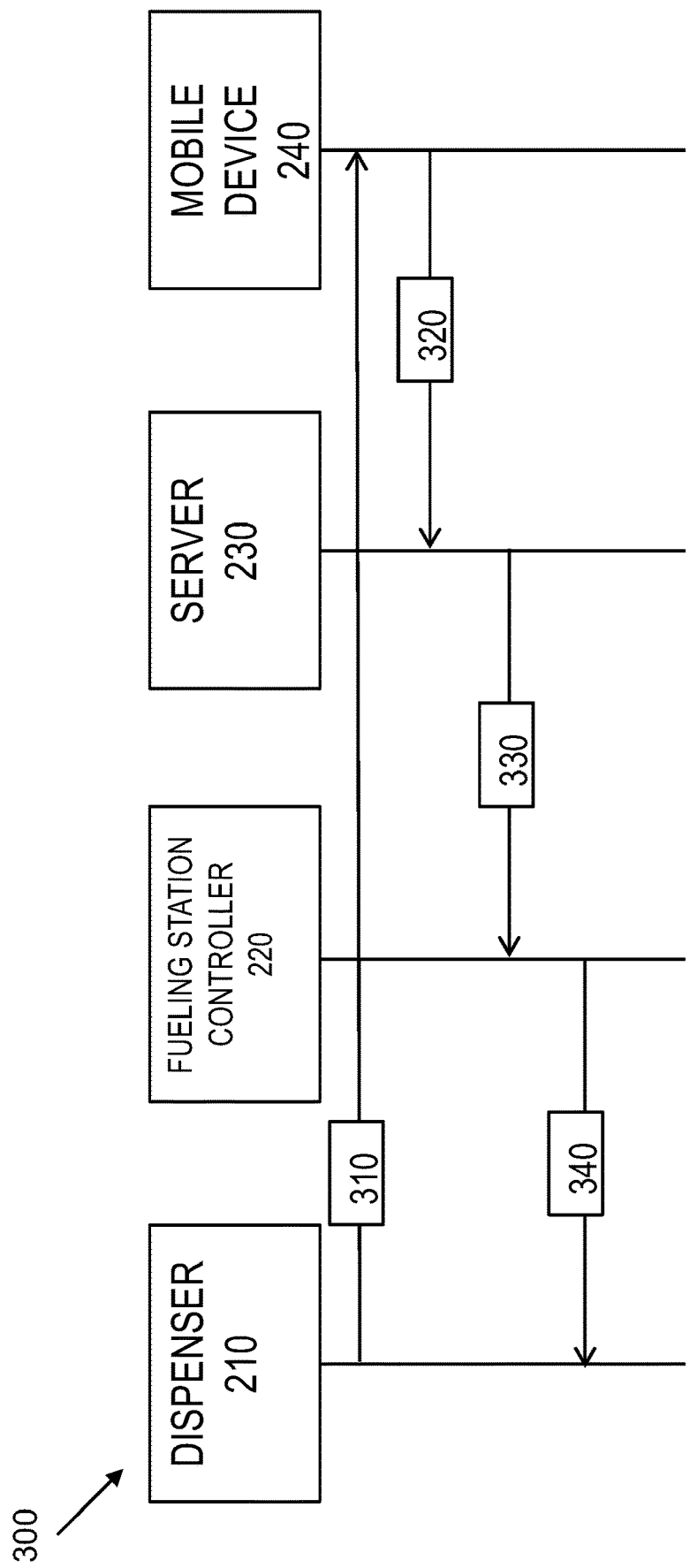

SECURE COMMUNICATIONS BETWEEN FUELING STATION COMPONENTS

FIELD

The current subject matter relates to secure communications between fueling station components.

BACKGROUND

Some current fueling environments rely on traditional methods of communication between fueling transaction components such as a fuel dispenser and a payment information device (e.g., debit/credit card, radio frequency identification (RFID) key fob encoding payment information, and the like). However, these methods have some security vulnerabilities as would-be identity thieves can install payment information interception devices on fuel dispensers and thereby intercept a customer's information.

In addition, fueling stations typically rely on traditional modes of media delivery, such as signage, flyers, posters, and social media to attract customers. It is difficult to deliver media pertaining to secondary products available at fueling stations, such as convenience store sales and on-site car washes, to customers at fueling stations that are solely purchasing fuel. In addition, at times, customers may visit a fueling station to purchase fuel, only to find that all fuel dispensers at the fueling station are occupied, which can result in customer frustration and/or a loss of business in the event the customer is unable or unwilling to wait for a fuel dispenser to become available.

SUMMARY

Methods and systems for secure communications between fueling station components are provided. Related apparatus, systems, techniques, and articles are also described.

In one aspect, data characterizing a selection of a fueling station item graphically depicted on a display of a fuel dispenser and corresponding to an available fueling station product, can be received by at least one data processor of a fuel dispenser. The at least one data processor can be operably coupled to the fuel dispenser display. A two-dimensional barcode encoding information characterizing the selected fueling station item can be determined by the at least one data processor and based on the received data. The two-dimensional barcode can be provided to the fuel dispenser display for graphical depiction on the fuel dispenser display.

One or more of the following features can be included in any feasible combination. For example, the two-dimensional barcode depicted on the fuel dispenser display can be received at a camera of an end user device, a data packet characterizing a status of a fueling station transaction can be received at the end user device, a second two-dimensional barcode, based on the two-dimensional barcode and the data packet and characterizing the fueling station transaction status and the selected fueling station item, can be determined at the end user device, and the second two-dimensional barcode can be provided to a display of the end user device for depiction on the end user device display. For example, the fueling station item can include one or more of a type of fuel, a grade of fuel, and an amount of fuel. For example, the fueling station item can include a usage of an air compressor. For example, the fueling station item can include a usage of an on-site car wash. For example, the fueling station item can include one or more convenience store items. For example, the two-dimensional barcode can be a quick reference code. For example, the second two dimensional barcode can be a quick reference code. For example, the fuel dispenser display can include a touchscreen. For example, the second two-dimensional barcode can encode information characterizing a coupon stored in a memory of the end user device.

In another aspect, a system is provided and can include at least one data processor and memory storing instructions configured to cause the at least one data processor to perform operations described herein. The operations can include receiving, by at least one data processor of a fuel dispenser, data characterizing a selection of a fueling station item, the fueling station item graphically depicted on a display of the fuel dispenser and corresponding to an available fueling station product, the at least one data processor operably coupled to the fuel dispenser display, determining, by the at least one data processor and based on the received data, a two-dimensional barcode encoding information characterizing the selected fueling station item, and providing the two-dimensional barcode to the fuel dispenser display for graphical depiction on the fuel dispenser display.

One or more of the following features can be included in any feasible combination. For example, the operations can further include receiving, at a camera of an end user device, the two-dimensional barcode depicted on the fuel dispenser display, receiving, at the end user device, a data packet, the data packet characterizing a status of a fueling station transaction, determining, based on the two-dimensional barcode and the data packet, and at the end user device, a second two-dimensional barcode, the second two-dimensional barcode encoding information characterizing the fueling station transaction status and the selected fueling station item, and providing the second two-dimensional barcode to a display of the end user device for depiction on the end user device display. For example, the fueling station item can include one or more of a type of fuel, a grade of fuel, and an amount of fuel. For example, the fueling station item can include a usage of an air compressor. For example, the fueling station item can include a usage of an on-site car wash. For example, the fueling station item can include one or more convenience store items. For example, the two-dimensional barcode can be a quick reference code. For example, the second two dimensional barcode can be a quick reference code. For example, the fuel dispenser display can include a touchscreen. For example, the second two-dimensional barcode can encode information characterizing a coupon stored in a memory of the end user device.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 2 is a system diagram illustrating an example system of some implementations of the current subject matter that can provide for secure payments and active marketing in fuel dispensing transactions;

FIG. 3 is a data flow diagram illustrating the transfer of data between the system components illustrated in FIG. 2;

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, a system for secure communication at fueling stations, and methods for use thereof, are provided. In some implementations, the system can include a fuel dispenser with a two-dimensional barcode generator that is configured to generate a two-dimensional barcode for use in communicating with a mobile device of a fuel dispenser user. After the fuel dispenser has selected various items, such as fuel, food and beverages, and/or the usage of such on-site services as the compressed air and car wash stations by interacting with a display of the fuel dispenser, the two-dimensional barcode generator can determine the two-dimensional barcode, which encodes information characterizing the selected items. The fuel dispenser can depict the two-dimensional barcode on a display of the fuel dispenser. A user can, by use of a camera on a mobile device, acquire an image of the displayed two-dimensional barcode, and an application on the mobile device can decode the information encoded in the two-dimensional barcode, perform further processing using the information (e.g., communicate with one or more remote servers for storage and/or logging data characterizing fueling station usage, etc.), thereby allowing for secure communications between components at a fueling station.

Figure 1:
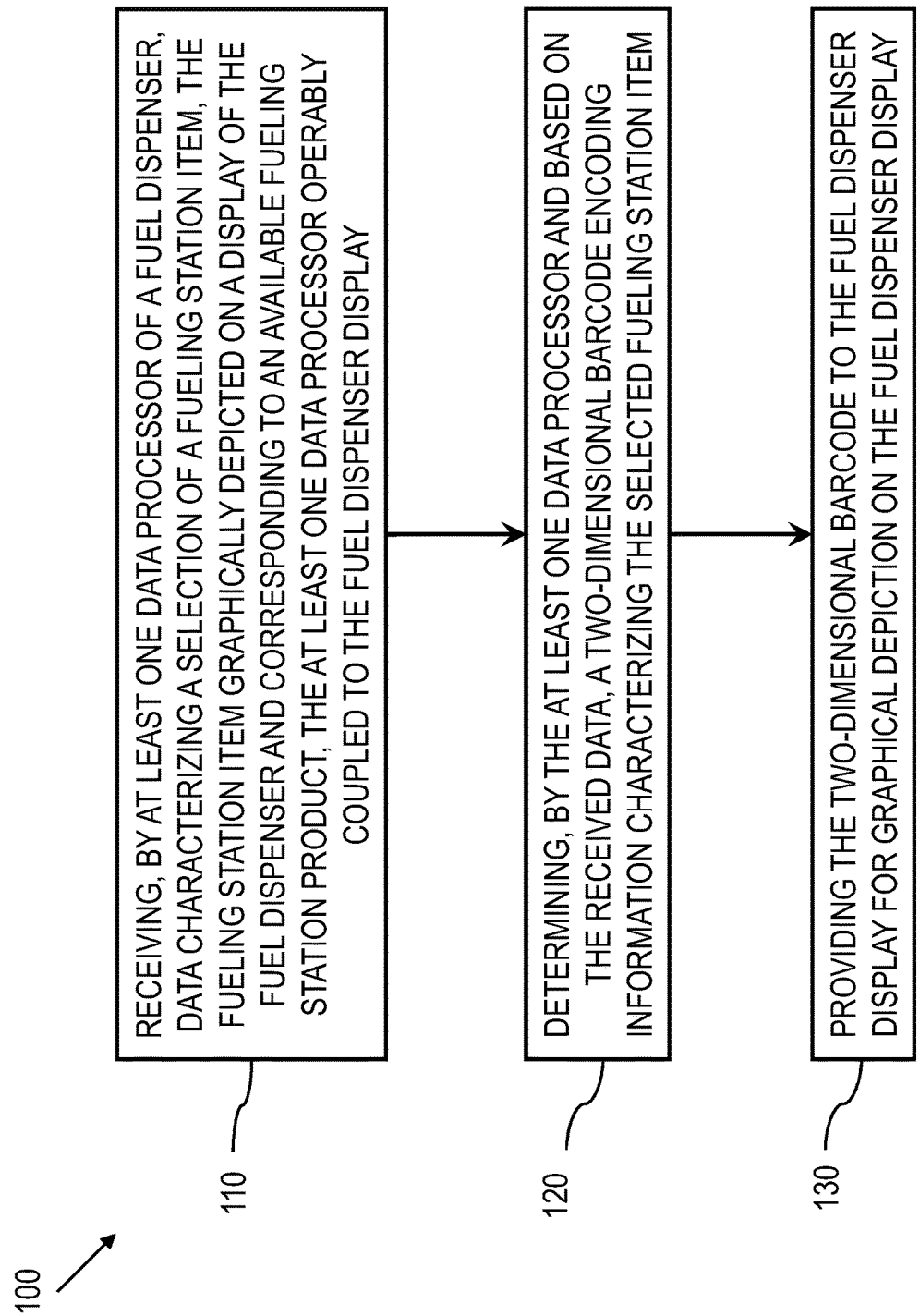
FIG. 1 is a process flow diagram illustrating an example process of some implementations of the current subject matter that can provide for secure payments and active marketing in fuel dispensing transactions.

FIG. 1 is a process flow diagram illustrating an example process 100 of some implementations of the current subject matter that can provide for secure communications between components at a fueling station, and FIG. 2 is a system diagram illustrating an example system 200 that incorporates some implementations of the current subject matter and that can provide for the same. As shown in FIG. 2, the system 200 includes a fuel dispenser 210 configured to dispense fuel and having at least one data processor configured to perform the functionality described herein; a fueling station 220 in operable communication with the fuel dispenser 210 that is configured to manage the dispensation of fuel from the fuel dispenser 210 and the purchase of fueling station items that are unrelated to the purchase of fuel; a server 230 in operable communication with the fueling station controller 220; and a mobile device 240 in operable communication with the fuel dispenser 210 and the server 230 and including an application configured to provide the functionality described herein.

Referring to both FIGS. 1 and 2, at 110, data characterizing a selection of a fueling station item can be received by at least one data processor of a fuel dispenser, such as fuel dispenser 210. In some implementations, the fueling station item can be a graphical object depicted on a display of the fuel dispenser that is operably coupled to the at least one data processor, and the at least one data processor can be configured to generate the fueling station item for depiction on the display. In some implementations, the display can be an interactive or touchscreen display wherein the user can touch or otherwise interact with the display to make the selection of the fueling station item.

In some implementations, the fueling station item can correspond to an available fueling station product that is presented to the user. In some implementations, the available fueling station product can include a type and/or grade of fuel selected by the user for dispensation from the fuel dispenser. In some implementations, the available fueling station product can include one or more convenience store items (e.g., food, beverage, automotive supplies, etc.). In some implementations, the available fueling station product can include one or more supplemental services (e.g., air compressor usage, on-site car wash services, etc.) that are available for purchase at the fuel dispenser.

In some implementations, the at least one data processor can include an input/output device configured to receive the selected fueling station item, a memory configured to store the selected fueling station item, and a processor configured to perform operations on the selected fueling station item, as discussed in further detail below. In some implementations, the at least one data processor can be a component of the fuel dispenser and housed therein. In some implementations, the at least one data processor can be located in at least one computing system at the fueling station, outside of the fuel dispenser. In some implementations, the at least one data processor can be located at a remote location, away from the fueling station and the fuel dispenser.

For example, in use, a user can arrive at the fueling station and park their vehicle in front of a fuel dispenser. The user can interact with the interactive display of the fuel dispenser by navigating through the interface to select one or more graphical objects depicted on the interactive display that correspond to a fueling station item (e.g., a type/grade of fuel available at the fuel dispenser; convenience store items, such as food, beverages, and/or automotive supplies available at the fueling station; and/or vehicle services, such as air compressor time and on-site car wash services, etc.). If the interactive display is a touchscreen, the user can touch the portion of the display that corresponds to the graphical object and thereby select their desired fueling station items.

At 120, a two-dimensional barcode can be determined by the at least one data processor based on the first data packet. The two-dimensional barcode can encode information that characterizes the selected fueling station item. In some implementations, the processor of the at least one data processor can access the memory of the at least one data processor to retrieve and convert the selected fueling station item into the two-dimensional barcode, which can be a graphical representation characterizing the selected fueling station item. For example, in some implementations, the processor of the at least one data processor can convert the selected fueling station item into a binary-type code, which can then be graphically represented (e.g., white portion for "0", black portion for "1"). In some implementations, the at least one data processor can convert the selected fueling station item into a quick reference code. In some implementations, data characterizing the selected fueling station item can be provided in a string or text format (e.g., American Standard Code for Information Interchange (ASCII) or other format) to the at least one data processor for conversion into the two-dimensional barcode. In some implementations, data characterizing the selected fueling station item can be transmitted between fueling station components in a string or text format.

At 130, the two-dimensional barcode can be provided to the fuel dispenser display. In some implementations, the two-dimensional barcode can be transmitted from the processor of the at least one data processor, through the input/output device of the at least one data processor, and to the fuel dispenser display for depiction thereon. In some implementations, the two dimensional barcode can be provided to the fuel dispenser display after dispensation of fuel from the fuel dispenser has occurred, and the two dimensional barcode can include information characterizing the dispensation of fuel.

The two dimensional barcode, and other types of data characterizing various aspects of the fueling station transaction, can be transmitted between various components of the fueling station. For example, in some implementations, the two-dimensional barcode can be scanned by a camera of a mobile device of the fueling station customer, such as mobile device 240. The mobile device, which can include memory and at least one data processor, can include an application that is configured to utilize the at least one data processor to recognize the two-dimensional barcode scanned by the camera and to discern the information encoded in the two-dimensional barcode.

The discerned information can be used by the processor to prepare a transaction data packet, which can be sent to a payment server, such as server 230. The transaction data packet can include information characterizing the purchased fueling station items. In some implementations, the application can also provide a prompt for the user to provide their payment method (e.g., credit card, debit card, etc.). In some implementations, the payment method can be stored on the mobile device. In some implementations, the payment method can be scanned or otherwise entered by the user into the application prompt and included as part of the transaction data packet. The payment server can send the transaction data packet to the fueling station's bank, which can send payment and a transaction authorization to the fueling station that indicates that the transaction is complete. In some implementations, when the customer has ordered convenience store items as part of the purchase, the application can instruct the processor to generate, and provide to an interactive display of the mobile device, an authorization two-dimensional barcode that encodes the transaction authorization and the ordered convenience store items. When the authorization two-dimensional barcode is depicted on the display of the mobile device, the customer can present the authorization two-dimensional code to a two-dimensional barcode reader located within a convenience store at the fueling station to pick up the convenience store items. In some implementations, more than one authorization two-dimensional barcode can be determined and provided to the interactive display of the mobile device for use by the user in picking up portions of the purchased fueling station items at various locations at the fueling station.

FIG. 3 is a data flow diagram 300 illustrating the transfer of one or more of the types of data described herein between the system components illustrated in FIG. 2 and in accordance with some implementations of the current subject matter. Referring to FIGS. 2 and 3, in some implementations, the two-dimensional barcode can encode information that characterizes, for example, the fueling station location, the fuel dispenser, and/or the fueling products (e.g., types/grades of fuel) available at the fuel dispenser. A user can, at 310, acquire an image of the two-dimensional barcode from an interactive display of the fuel dispenser 210 using the camera on the user's mobile device 240, and the camera can, in turn, provide the image to an image processor on the mobile device.

In some implementations, prior to the dispensation of fuel from the fuel dispenser, the customer can, instead of selecting their desired products on the interactive display of the fuel dispenser, select their desired products via the application on their mobile device. Similar to the functionality described above, a user can acquire an image of a two-dimensional barcode from a fuel dispenser using the camera on the user's mobile device and provide the image to an image processor on the mobile device. The image processor can decode the information encoded in the two-dimensional barcode and provide the decoded information to the application for further processing by the application during a fueling transaction. For example, in some implementations, wherein the decoded information characterizes the fueling station, the fuel dispenser, and the fueling products available at the fuel dispenser, the application can generate a graphical representation of the fueling products and provide the graphical representation to the interactive display of the mobile device. As such, the application can depict a fueling station item on an interactive display of the mobile device. Similar to the functionality above, the fueling station item can characterize the various products and services available for selection by a user at a fueling station, such as a type/grade/amount of fuel, food, beverage, automotive supplies, car wash products, and the like. The user can select the fueling station item by interacting with the interactive display of the mobile device. In some implementations, the application can provide an interface for the user to provide a desired sale amount of fuel and to total any additional fueling station items with the desired sale amount to create a pre-authorization amount. The application can also provide a prompt for the user to provide their payment method (e.g., credit card, debit card, etc.). In some implementations, the payment method can be stored on the mobile device. In some implementations, the payment method can be scanned or otherwise entered by the user into the application prompt.

The mobile device 240 can then provide, at 320, via communication components of the mobile device (e.g., Wi-Fi transceiver, cellular transceiver, etc.) in response to an instruction from the user to purchase the fueling product from the fuel dispenser, information characterizing the fueling product selection, the fuel dispenser, the fueling station, and any payment information associated with the user previously stored on the mobile device (such as credit/debit card information) to a transaction server (such as 230) in operable communication with the mobile device 240. The transaction server can generate a pre-authorization inquiry that includes a pre-authorization amount of money and provide the pre-authorization inquiry to a payment server of a merchant associated with the user's payment information that is also in operable communication with the transaction server 230. The payment server can determine whether a bank account (or line of credit, if the payment information includes credit card information) associated with the payment information has funds available for payment of the fueling transaction.

If the payment server determines that the bank account (or line of credit, if applicable) has sufficient funds for payment for the fueling transaction, based on the pre-authorization amount of money, the payment server can generate and provide an authorization instruction to the transaction server that contains information characterizing an instruction to proceed with the fueling transaction in accordance with the pre-authorization amount of money. The transaction server 230 can, in response to receiving the authorization instruction, generate a fueling instruction characterizing a command to dispense fuel. The fueling instruction can include information characterizing the fuel dispenser, the fueling station, the pre-authorization amount of money, and the desired fueling product. The fueling instruction can be provided by the transaction server, at 330, to a fueling station controller, such as fueling station controller 220, at the fueling station. At 340, the fueling station controller 220 can generate and provide a command to the fuel dispenser 210 to instruct the user to remove the fuel dispenser nozzle from the fuel dispenser and dispense the selected fuel via the nozzle in accordance with the fueling instruction. In some implementations, the transaction server can generate and provide the fueling instruction and the command directly to the fuel dispenser, bypassing the fueling station controller 220.

Once the user has finished dispensing the fuel and replaced the nozzle on the fuel dispenser, the fuel dispenser generates and provides a transaction completion instruction to the transaction server. In some implementations, the transaction completion instruction can be provided to the transaction server via the forecourt controller. The transaction completion instruction can include such information as a quantity of fuel dispensed and a total sale amount. The transaction server can generate a payment settlement instruction containing a command to settle the payment for the fueling transaction and provide the payment settlement instruction to the payment server, which executes the payment settlement command. The transaction server can also generate a notification signifying that the transaction has been completed and provide the notification to the mobile device. The mobile device can display the notification to the user via the interactive display.

In some implementations, the application can provide instructions to a processor of the mobile device that can determine, based on the selected fueling station item (and thereby the selected product(s)/service(s)), an application two-dimensional barcode, which can be provided to the interactive display of the mobile device. Similar to the two-dimensional barcodes discussed above, the application two-dimensional barcode can encode information that characterizes the selected fueling station item. In some implementations, the processor of the mobile device can access the memory of the mobile device to retrieve and convert data characterizing the purchased products into the application two-dimensional barcode, which can be a graphical representation characterizing the selected products. For example, in some implementations, the processor of the mobile device can convert the first data packet into a binary-type code, which can then be graphically represented (e.g., white portion for "0", black portion for "1"). In some implementations, the processor of the mobile device can convert selected fueling station item into a quick reference code.

A user can then present the application two-dimensional barcode, as depicted on the interactive display of the mobile device, to a two-dimensional barcode reader disposed on the fuel dispenser. The two-dimensional barcode reader can read the application two-dimensional barcode and transmit the application two-dimensional barcode to the at least one data processor of the fuel dispenser. The at least one data processor of the fuel dispenser can decode the application two-dimensional barcode to determine the products (e.g., type/grade/amount of fuel) characterized by the selected fueling station item. The at least one data processor can activate various functions of the fuel dispenser, such as the dispensation of the purchased type/grade/amount of fuel, based on the selected fueling station item determined from the application two-dimensional barcode, such that the user may receive their selected products.

As mentioned above, in some implementations, the selected products can include convenience store items, such as food, beverage, automotive supplies, and the like, available for pickup at the convenience store of the fueling station. When the selected products include these items (and the application two-dimensional barcode encodes information characterizing the selected products in the manner described above), the user can present the application two-dimensional barcode to a two-dimensional barcode reader located within the convenience store, which can similarly read the barcode and transmit the barcode to at least one data processor of a convenience store register. The at least one data processor of the convenience store register can decode the application two-dimensional barcode to determine the selected products and authorize the pickup of these items by the user.

The application can also include several capabilities that facilitate the functionality described herein. For example, in some implementations, the application can provide a depiction, to the interactive display of the mobile device, that indicates to the user the locations of nearby fueling stations and/or convenience stores. In some implementations, the application can provide, to the interactive display of the mobile device, a graphical depiction of the pumps at a fueling station that can indicate the types/grades of fuel available at each pump. The application can also provide a depiction, to the interactive display of the mobile device, that indicates available marketing and promotional offers that are applicable to products and/or services available at a fueling station and/or convenience store that located nearby, as identified by the application. In some implementations, the application can provide the depiction of the marketing and promotional offers specific to a particular fueling station in response to detecting, via the determined location of the mobile device, that the user has arrived at that fueling station. In some implementations, the application can retrieve coupons for the products and/or services, in two-dimensional barcode format, that are stored in the memory of the mobile device, and the application can provide a two-dimensional barcode characterizing the coupon to the interactive display of the mobile device, which can then be presented by the user to the fuel dispenser two-dimensional barcode reader and/or the convenience store register two-dimensional barcode reader for redemption by the user in a fueling station transaction. In some implementations, data characterizing the coupon can be encoded into the application two-dimensional barcodes described herein, such that, for example, the user can redeem the coupon when the two-dimensional barcodes are presented to the fuel dispenser two-dimensional barcode reader and/or the convenience store register two-dimensional barcode reader in accordance with the functionality described herein.

In some implementations, the application can include an input dialog configured to receive promotion and/or discount codes that permit the user to take advantage of reduced-price products and/or services. In some implementations, the application can also receive voice commands from a user and determine the products selected for purchase based on the voice commands. In some implementations, the application can transmit, via the communication interfaces of the mobile device, information about the fueling station items to other mobile device users. In some implementations, the authorization two-dimensional barcodes described herein can be forwarded to other mobile device users to thereby enable individuals other than the original purchaser to obtain the purchased fueling station items. In some implementations, the application can display the two-dimensional barcodes described herein on accessories operably coupled to the mobile device (e.g., smart watches etc.).

In some implementations, a static two-dimensional barcode can be displayed on an exterior surface of the fuel dispenser (e.g., a fuel dispenser electronics compartment or a fuel dispenser pump compartment). Similar to the two-dimensional barcode described above, the static two-dimensional barcode can encode information that characterizes, for example, the fueling station location, the fuel dispenser, and/or the fueling products (e.g., types/grades of fuel) available at the fuel dispenser. A user can acquire an image of the static two-dimensional barcode using the camera on the user's mobile device, and the camera can, in turn, provide the image to an image processor on the mobile device.

Similar to the functionality described above, the image processor can decode the information encoded in the static two-dimensional barcode and provide the decoded information to the application for further processing by the application during a fueling transaction. For example, in some implementations, wherein the decoded information characterizes the fueling station, the fuel dispenser, and the fueling products available at the fuel dispenser, the application can generate a graphical representation of the fueling products and provide the graphical representation to the interactive display of the mobile device. The user can then select the graphical representation corresponding to the desired fueling product via the interactive display. The application can then provide, via communication components of the mobile device (e.g., Wi-Fi transceiver, cellular transceiver, etc.) in response to an instruction from the user to purchase the fueling product from the fuel dispenser, information characterizing the fueling product selection, the fuel dispenser, the fueling station, and any payment information associated with the user previously stored on the mobile device (such as credit/debit card information) to a transaction server in operable communication with the mobile device. The transaction server can generate a pre-authorization inquiry that includes a pre-authorization amount of money and provide the pre-authorization inquiry to a payment server of a merchant associated with the user's payment information. The payment server can determine whether a bank account (or line of credit, if the payment information includes credit card information) associated with the payment information has funds available for payment of the fueling transaction.

If the payment server determines that the bank account (or line of credit, if applicable) has sufficient funds for payment for the fueling transaction, based on the pre-authorization amount of money, the payment server can generate and provide an authorization instruction to the transaction server that contains information characterizing an instruction to proceed with the fueling transaction in accordance with the pre-authorization amount of money. The transaction server can, in response to receiving the authorization instruction, generate a fueling instruction characterizing a command to dispense fuel. The fueling instruction can include information characterizing the fuel dispenser, the fueling station, the pre-authorization amount of money, and the desired fueling product. The fueling instruction can be provided by the transaction server to a forecourt controller at the fueling station, which can generate and provide a command to the fuel dispenser to instruct the user to remove the fuel dispenser nozzle from the fuel dispenser and dispense the selected fuel via the nozzle in accordance with the fueling instruction. In some implementations, the transaction server can generate and provide the fueling instruction and the command directly to the fuel dispenser, bypassing the forecourt controller.

Once the user has finished dispensing the fuel and replaced the nozzle on the fuel dispenser, the fuel dispenser generates and provides a transaction completion instruction to the transaction server. In some implementations, the transaction completion instruction can be provided to the transaction server via the forecourt controller. The transaction completion instruction can include such information as a quantity of fuel dispensed and a total sale amount. The transaction server can generate a payment settlement instruction containing a command to settle the payment for the fueling transaction and provide the payment settlement instruction to the payment server, which executes the payment settlement command. The transaction server can also generate a notification signifying that the transaction has been completed and provide the notification to the mobile device. The mobile device can display the notification to the user via the interactive display.

Figure 4B:
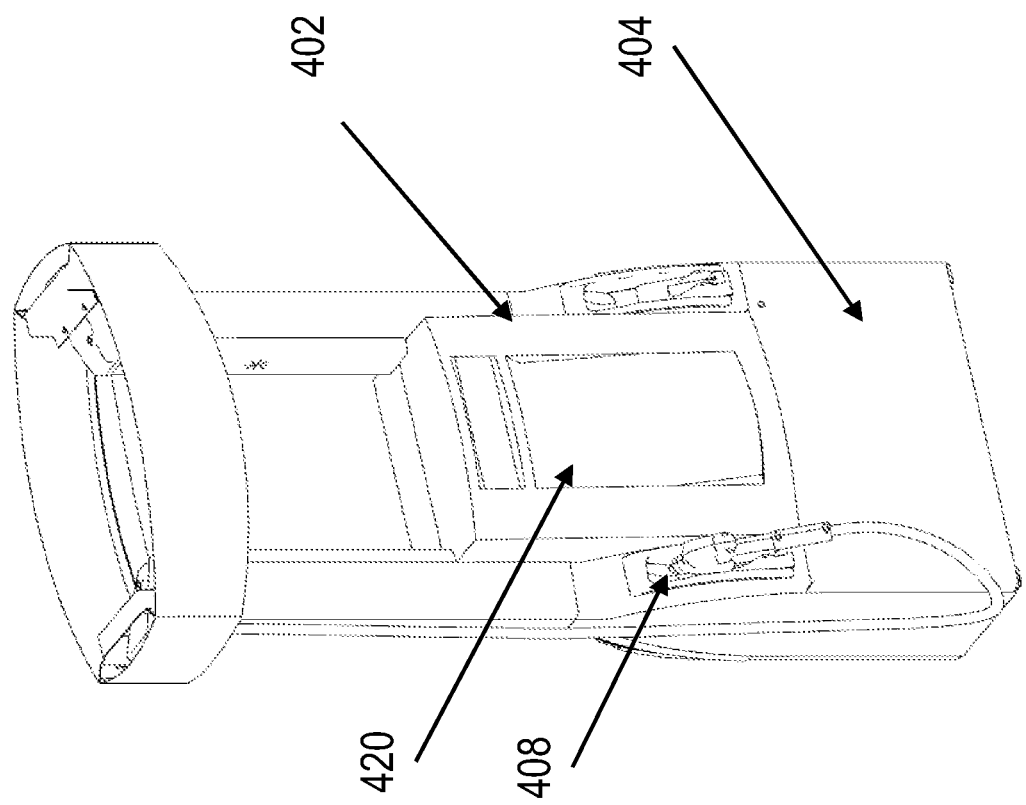
FIG. 4B is a front perspective view of the fuel dispenser shown in FIG. 4A.
Figure 4A:
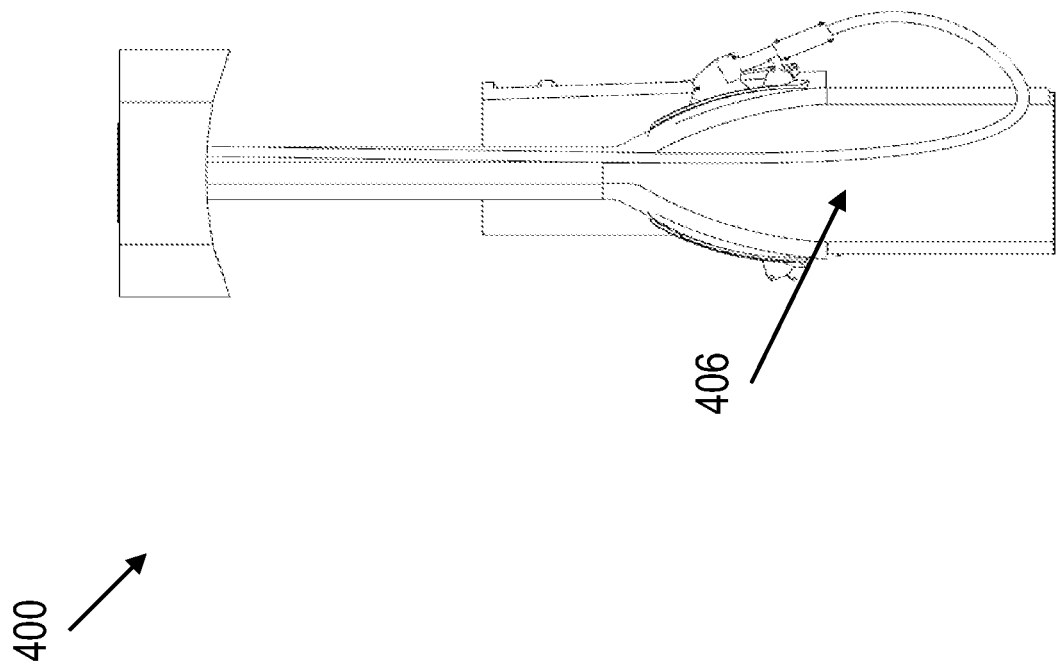
FIG. 4A is a side perspective view of one embodiment of a fuel dispenser.
Figure 5:
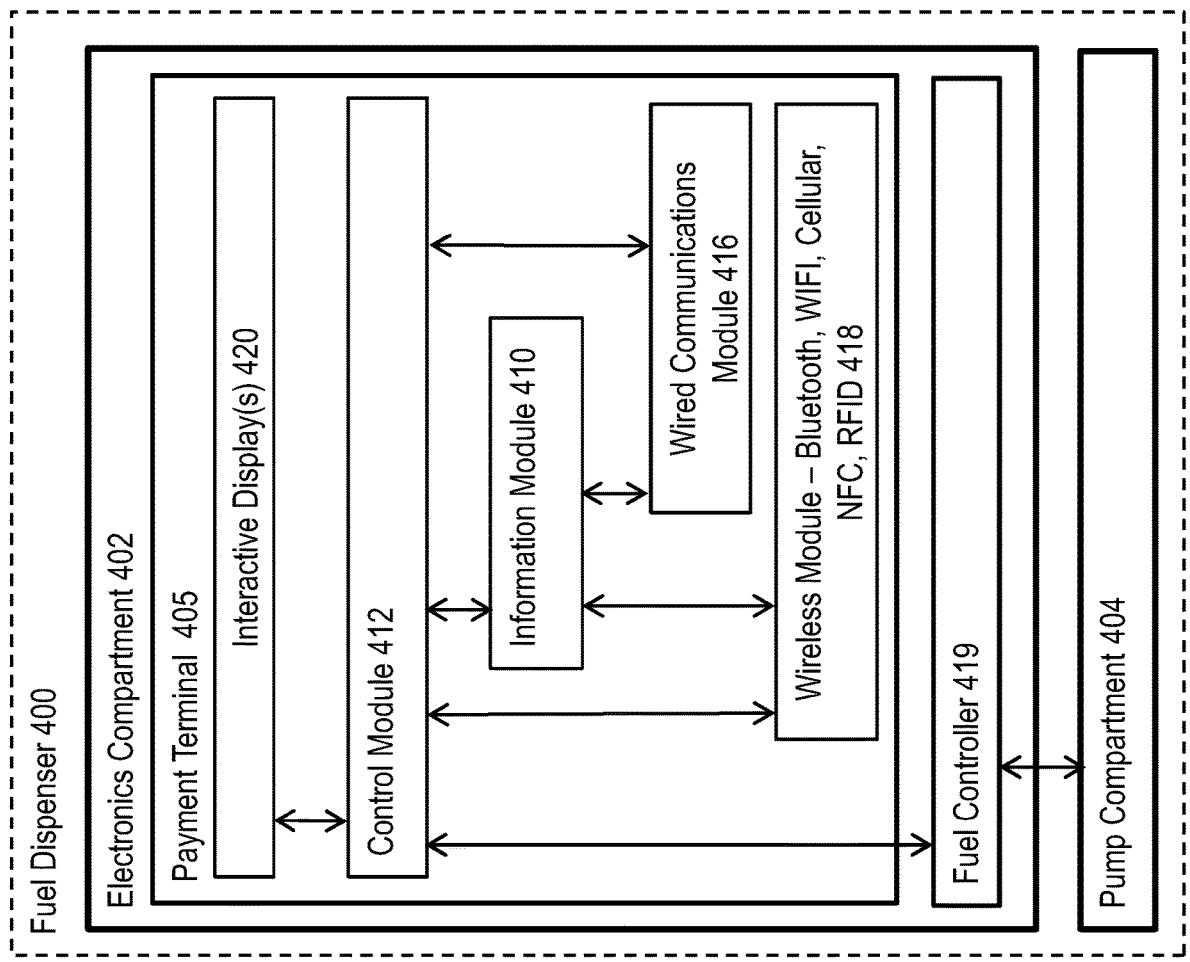
FIG. 5 is a diagram showing internal components of the fuel dispenser of FIGS. 4A and 4B.

FIGS. 4A and 4B illustrate one embodiment of a fuel dispenser 400 that can be used in some implementations of the current subject matter, and FIG. 5 illustrates components of the fuel dispenser. In general, the fuel dispenser 400 includes an electronics compartment 402 and a pump compartment 404. The pump compartment 404 houses a pump configured to pump fuel from a fuel tank or other reservoir, as well as one or more meters that can be configured to monitor fuel flow, flow of fuel additives, and/or flow of other components of the fuel. The pump compartment 404 can also include other components to facilitate fuel dispensing and mixing, such as motors and valves, a strainer/filtering system, a vapor recovery system, and the like. The pump compartment 404 is isolated from the electronics compartment 402 within the fuel dispenser 400 to facilitate safety, security, and/or maintenance, as will be appreciated by a person skilled in the art. Fuel is thus not allowed to flow from the pump compartment 404 to the electronics compartment 302 and instead flows from the pump compartment 404 through hoses 406 to nozzles 408 for dispensing. As will be appreciated by a person skilled in the art, the nozzles 408 are each configured to dispense fuel from the fuel dispenser 400 as pumped therefrom by the pump.

The electronics compartment 402 houses electronics for facilitating payment for fuel and for facilitating the dispensing of the fuel. For example, the electronics compartment 402 can include a fuel controller 419 that, at least in some implementations, includes a data processor, memory, and storage forming part of at least one computing system. The fuel controller 419 is configured to control dispensing of the fuel from the pump compartment 404. The electronics compartment 402 also includes a payment terminal 405 that is configured to provide a user with one or more options to create a desired fuel mixture, receive instructions characterizing the desired fuel mixture, receive payment information and/or user identification information from a user, transmit and receive the payment information and/or the user identification information with a POS system via a forecourt controller, and deliver fueling instructions to the fuel controller 419 to dispense fuel. The payment terminal 405 can also be configured to provide a user with information related to a status of fueling. For example, the payment terminal can display an amount of fuel that has been dispensed, and a corresponding fuel cost as the fuel mixture is dispensed.

The payment terminal 405 can be configured to facilitate communication between a user and the fuel controller 419, and can include an interactive display 420 and an information module 410. The information module 410 can, at least in some implementations include a data processor, memory, and storage, forming part of at least one computing system. The payment terminal 405 can also include one or more wired communication modules 416 and/or wireless communication modules 418 and a control module 412 that, at least in some implementations includes a data processor, memory, and storage, forming part of at least one computing system. The communication modules 416, 418 can function to allow data to be transmitted to and from various components within the payment terminal 405 via wired and/or wireless communication, respectively. For example, the communication modules 416, 418 can be configured to transmit and receive signals that can characterize, e.g., payment information, user identification information, and/or information regarding a desired fuel selection, via wired and/or wireless communications, respectively. The wireless communication module 418 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 416, 418 can be according to any of a variety of communication protocols, e.g., TCP/IP, etc., as will be appreciated by a person skilled in the art.

The interactive display 420, which can be, or can include, a touchscreen. The interactive display 420 can be operably coupled to the control module 412 which can be used to control, dynamically rearrange, and/or update a graphical user interface (GUI) rendered on the display 420. The display 420 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 412 to be processed. Some examples of information that the display 420 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select.

To facilitate payment, the information module 410 can be configured to receive input such as, e.g., user identification information and/or payment information, and deliver the information to the control module 412. For example, the information module 310 can include a barcode and/or QR code scanner, and/or a NFC contactless card reader for receiving payment information and/or user identification information.

In some embodiments, the information module 410 can include an image sensor for acquiring images of facial features of the user, barcode and/or QR code information (e.g., to scan a loyalty rewards card), vehicle features (e.g., vehicle make, model, color, etc.), license plate number, non-facial body features, and the like, which can be used as user identification information. As another example, the information module can include a palm reader and or/fingerprint reader which can scan a palm and/or finger of the user to obtain user identification information. In some embodiments, the user identification information can be associated with a loyalty rewards identifier automatically. Accordingly, in some embodiments, a pre-determined payment method, and user preferences, can be determined based on user identification information.

As shown in FIG. 5, the information module 410 can be operably coupled to the wired communication module 416 and/or the wireless communication module 418. The wired and wireless communication modules 416, 418 can allow the information module 410 to send and receive payment information and/or user identification information to and from a mobile device such as a smart phone, tablet, laptop, and the like, that is in electronic communication with the information module 410 via the wired and/or wireless communication modules 416, 418. Although the wireless communication module 418 is shown to be located within the payment terminal, the wireless communication module 418 can be located elsewhere on, within, or in the vicinity of, the fuel dispenser 400. For example, the wireless communication module 418 can be mounted on top of the fuel dispenser, which can facilitate retrofitting the wireless communication module 418 to existing fuel dispensers and/or facilitate repair, upgrade, or other maintenance of the communication module 418, as described in U.S. patent application Ser. No. 15/182,201 filed on Jun. 14, 2016 and entitled "Methods and Devices for Fuel Dispenser Electronic Communication."

The subject matter described herein can provide several advantages. By using the functionality and components described above, a customer can complete a fueling station transaction without having to provide credit card payment information to a fuel dispenser or a convenience store at the fueling station, which can eliminate the risk of theft of the customer's credit card information via such devices as credit card skimmers. The functionality described herein also provides for improved transaction speed as compared to conventional payment methods.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
   receiving, by at least one data processor of a fuel dispenser, data characterizing a selection of a fueling station item, the fueling station item graphically depicted on a display of the fuel dispenser and characterizing a fuel available at the fuel dispenser, the at least one data processor operably coupled to the fuel dispenser display;
   determining, by the at least one data processor and based on the received data, a two-dimensional barcode encoding information characterizing the selected fueling station item;
   displaying the two-dimensional barcode on the fuel dispenser display;
   receiving, by the at least one data processor, a fueling instruction characterizing a command to dispense, by the fuel dispenser, an authorized amount of the fuel, the fueling instruction determined based on authorization data characterizing the authorized amount of the fuel, the authorization data determined based on a user interaction with the displayed two-dimensional barcode; and
   causing the fuel dispenser to dispense the authorized amount of fuel based on the received fueling instruction.

2. The method of claim 1, further comprising:
   receiving, at a camera of an end user device, the two-dimensional barcode depicted on the fuel dispenser display;
   receiving, at the end user device, a data packet, the data packet characterizing a status of a fueling station transaction;
   determining, based on the two-dimensional barcode and the data packet, and at the end user device, a second two-dimensional barcode, the second two-dimensional barcode encoding information characterizing the fueling station transaction status and the selected fueling station item; and
   providing the second two-dimensional barcode to a display of the end user device for depiction on the end user device display.

3. The method of claim 1, wherein the fueling station item characterizes one or more of a type of the fuel, a grade of the fuel, and an amount of the fuel.

4. The method of claim 1, wherein the fueling station item characterizes a usage of an air compressor.

5. The method of claim 1, wherein the fueling station item charactelizes a usage of an on-site car wash.

6. The method of claim 1, wherein the fueling station item characterizes one or more convenience store items.

7. The method of claim 1, wherein the two-dimensional barcode is a quick reference code.

8. The method of claim 2, wherein the second two dimensional barcode is a quick reference code.

9. The method of claim 1, wherein the fuel dispenser display comprises a touchscreen.

10. The method of claim 2, wherein the second two dimensional barcode encodes information characterizing a coupon stored in a memory of the end user device.

11. A system comprising:
at least one data processor; and
memory storing instructions configured to cause the at least one data processor to perform operations comprising:
receiving, by at least one data processor of a fuel dispenser, data characterizing a selection of a fueling station item, the fueling station item graphically depicted on a display of the fuel dispenser and characterizing a fuel available at the fuel dispenser, the at least one data processor operably coupled to the fuel dispenser display;
determining, by the at least one data processor and based on the received data, a two-dimensional barcode encoding information characterizing the selected fueling station item;
displaying, the two-dimensional barcode on the fuel dispenser display;
receiving, by the at least one data processor, a fueling instruction characterizing a command to dispense, by the fuel dispenser, an authorized amount of the fuel, the fueling instruction determined based on authorization data characterizing the authorized amount of the fuel, the authorization data determined based on a user interaction with the displayed two-dimensional barcode; and
causing the fuel dispenser to dispense the authorized amount of fuel based on the received fueling instruction.

12. The system of claim 11, the operations further comprising:
receiving, at a camera of an end user device, the two-dimensional barcode depicted on the fuel dispenser display;
receiving, at the end user device, a data packet, the data packet characterizing a status of a fueling station transaction;
determining, based on the two-dimensional barcode and the data packet, and at the end user device, a second two-dimensional barcode, the second two-dimensional barcode encoding information characterizing the fueling station transaction status and the selected fueling station item; and
providing the second two-dimensional barcode to a display of the end user device for depiction on the end user device display.

13. The system of claim 11, wherein the fueling station item includes one or more of a type of the fuel, a grade of the fuel, and an amount of the fuel.

14. The system of claim 11, wherein the fueling station item characterizes a usage of an air compressor.

15. The system of claim 11, wherein the fueling station item characterizes a usage of an on-site car wash.

16. The system of claim 11, wherein the fueling station item characterizes one or more convenience store items.

17. The system of claim 11, wherein the two-dimensional barcode is a quick reference code.

18. The system of claim 12, wherein the second two dimensional barcode is a quick reference code.

19. The system of claim 11, wherein the fuel dispenser display comprises a touchscreen.

20. The system of claim 12, wherein the second two dimensional barcode encodes information characterizing a coupon stored in a memory of the end user device.

21. A non-transitory computer program product storing instructions which, when executed by at least one data processor forming part of at least one computing system, cause the at least one data processor to implement operations comprising:
receiving, by at least one data processor of a fuel dispenser, data characterizing a selection of a fueling station item, the fueling station item graphically depicted on a display of the fuel dispenser and characterizing a fuel available at the fuel dispenser, the at least one data processor operably coupled to the fuel dispenser display;
determining, by the at least one data processor and based on the received data, a two-dimensional barcode encoding information characterizing the selected fueling station item;
displaying the two-dimensional barcode on the fuel dispenser display;
receiving, by the at least one data processor, a fueling instruction characterizing a command to dispense, by the fuel dispenser, an authorized amount of the fuel, the fueling instruction determined based on authorization data characterizing the authorized amount of the fuel, the authorization data determined based on a user interaction with the displayed two-dimensional barcode; and
causing the fuel dispenser to dispense the authorized amount of fuel based on the received fueling instruction.

22. The computer program product of claim 21, the operations further comprising:
receiving, at a camera of an end user device, the two-dimensional barcode depicted on the fuel dispenser display;
receiving, at the end user device, a data packet, the data packet characterizing a status of a fueling station transaction;
determining, based on the two-dimensional barcode and the data packet, and at the end user device, a second two-dimensional barcode, the second two-dimensional barcode encoding information characterizing the fueling station transaction status and the selected fueling station item; and
providing the second two-dimensional barcode to a display of the end user device for depiction on the end user device display.

23. The computer program product of claim 21, wherein the two-dimensional barcode is a quick reference code.

24. The computer program product of claim 21, wherein the fuel dispenser display comprises a touchscreen.

* * * * *